United States Patent [19]

Dixon

[11] Patent Number: 5,402,413
[45] Date of Patent: Mar. 28, 1995

[54] THREE-CELL WIRELESS COMMUNICATION SYSTEM

[75] Inventor: Robert C. Dixon, Palmer Lake, Colo.

[73] Assignee: Omnipoint Corporation, Colorado Springs, Colo.

[21] Appl. No.: 682,050

[22] Filed: Apr. 8, 1991

[51] Int. Cl.⁶ .................... H04J 13/00; H04J 3/16; H04B 15/00; H04M 11/00
[52] U.S. Cl. ................... 370/18; 370/95.3; 375/200; 455/33.1; 455/56.1; 379/59
[58] Field of Search ............ 455/33.1, 33.2, 33.4, 455/54.1, 56.1; 379/59, 60; 375/1; 370/18, 95.1, 95.3

[56] References Cited

U.S. PATENT DOCUMENTS

| | | |
|---|---|---|
| 27,738 | 8/1873 | Honma et al. |
| 3,934,203 | 1/1976 | Schiff. |
| 3,978,436 | 8/1976 | Alig et al. |
| 4,021,898 | 5/1977 | Willis et al. |
| 4,051,448 | 9/1977 | Coussot. |
| 4,100,498 | 7/1978 | Alsup et al. |
| 4,131,484 | 12/1978 | Caruso et al. |
| 4,163,944 | 8/1979 | Chambers et al. |
| 4,217,563 | 8/1980 | Vale. |
| 4,222,115 | 9/1980 | Cooper et al. ........... 455/33.2 |
| 4,247,942 | 1/1981 | Hauer. |
| 4,314,393 | 2/1982 | Wakatsuki et al. |
| 4,355,411 | 10/1982 | Revdink et al. ........ 455/33.2 |
| 4,418,393 | 11/1983 | Zacheile, Jr. |
| 4,418,425 | 11/1983 | Fennel, Jr. et al. |
| 4,432,089 | 2/1984 | Wurzburg et al. |
| 4,445,256 | 5/1984 | Huguenin et al. |
| 4,455,651 | 6/1984 | Baran. |
| 4,456,793 | 6/1984 | Baker et al. |
| 4,484,028 | 11/1984 | Kelley et al. |
| 4,517,679 | 5/1985 | Clark et al. |
| 4,525,835 | 6/1985 | Vance et al. |
| 4,550,414 | 10/1985 | Guinon et al. |
| 4,561,089 | 12/1985 | Rouse et al. |
| 4,562,370 | 12/1985 | Von Dach. |
| 4,563,774 | 1/1986 | Gloge. |
| 4,567,588 | 1/1986 | Jerrim. |

(List continued on next page.)

OTHER PUBLICATIONS

Kavehrad, M. and McLane, P. J., *Spread Sprectrum for Indoor Digital Radio*, IEEE Communications Magazine, Jun. 1987, vol. 25, No. 5 pp. 23–40.

Robert C. Dixon, *Spread Spectrum Systems*, John Wiley & Sons, Inc., 1984; pp. 84–86, 206.

Ralph Eschenbach, *Applications of Spread Spectrum Radio to Indoor Data Communications*, Hewlett-Packard Laboratories, IEEE 1982, pp. 34.5-1–34.5-3.

Payne Freret et al., *Applications of Spread-Spectrum Radio to Wireless Terminal Communications*, Hewlett-Packard Laboratories, IEEE 1980, pp. 69.7.1–69.7.4.

Payne Freret, *Wireless Terminal Communications Using Spread-Spectrum Radio*, Hewlett–Packard Laboratories, IEEE 1980, pp. 244–247.

M. Kavehrad and P. J. McLane, *Performance of Low--Complexity Channel Coding and Diversity for Spread Spectrum in Indoor, Wireless Communication*, AT&T (List continued on next page.)

*Primary Examiner*—Reinhard J. Eisenzopf
*Assistant Examiner*—Andrew Faile
*Attorney, Agent, or Firm*—Lyon & Lyon

[57] ABSTRACT

A wireless communication system including a repeated pattern of cells, in which base station transmitters and user station transmitters for each cell may be assigned a spread-spectrum code for modulating radio signal communication in that cell. Radio signals used in that cell are spread across a bandwidth sufficiently wide that both base station receivers and user station receivers in an adjacent cell may distinguish communication which originates in one cell from another. Adjacent cells may use distinguishable frequencies and distinguishable codes, but it is sufficient if adjacent cells use distinguishable frequencies and identical codes. A repeated pattern of cells allows the codes each to be reused in a plurality of cells.

17 Claims, 2 Drawing Sheets

U.S. PATENT DOCUMENTS

| | | |
|---|---|---|
| 4,569,062 | 2/1986 | Dellande et al. . |
| 4,601,047 | 7/1986 | Horwitz et al. . |
| 4,606,039 | 8/1986 | Nicolas et al. . |
| 4,612,637 | 9/1986 | Davis et al. . |
| 4,621,365 | 11/1986 | Chiu . |
| 4,622,854 | 11/1986 | Locke et al. . |
| 4,641,317 | 2/1987 | Fullerton . |
| 4,642,505 | 2/1987 | Arvanitis . |
| 4,647,863 | 3/1987 | Skudera, Jr. et al. . |
| 4,649,549 | 3/1987 | Halpern et al. . |
| 4,653,069 | 3/1987 | Roeder . |
| 4,660,164 | 4/1987 | Leibowitz . |
| 4,672,254 | 6/1987 | Dolat et al. . |
| 4,672,658 | 6/1987 | Kavehrad et al. . |
| 4,680,785 | 7/1987 | Akiyama et al. . |
| 4,691,326 | 9/1987 | Tsuchiya . |
| 4,701,904 | 10/1987 | Darcie . |
| 4,703,474 | 10/1987 | Foschini et al. . |
| 4,707,839 | 11/1987 | Andren et al. . |
| 4,718,080 | 1/1988 | Serrano . |
| 4,724,435 | 2/1988 | Moses et al. . |
| 4,742,512 | 5/1988 | Akashi et al. . |
| 4,745,378 | 5/1988 | Niitsuma et al. . |
| 4,754,453 | 6/1988 | Eizenhofer . |
| 4,754,473 | 6/1988 | Edwards . |
| 4,759,034 | 7/1988 | Nagazumi . |
| 4,759,078 | 7/1988 | Schiller . |
| 4,769,812 | 9/1988 | Shimizu . |
| 4,787,093 | 11/1988 | Rorden . |
| 4,800,885 | 1/1989 | Johnson . |
| 4,804,938 | 2/1989 | Rouse et al. . |
| 4,805,208 | 2/1989 | Schwartz . |
| 4,807,222 | 2/1989 | Amitay . |
| 4,813,057 | 3/1989 | Fullerton . |
| 4,815,106 | 3/1989 | Propp et al. . |
| 4,833,702 | 5/1989 | Shitara et al. . |
| 4,837,786 | 6/1989 | Gurantz et al. . |
| 4,837,802 | 6/1989 | Higashiyama et al. . |
| 4,860,307 | 8/1989 | Nakayama . |
| 4,866,732 | 9/1989 | Carey et al. . |
| 4,878,238 | 10/1989 | Rash et al. . |
| 4,893,327 | 1/1990 | Stern et al. .................... 455/33.1 |
| 4,894,842 | 1/1990 | Broekhaven et al. . |
| 4,901,307 | 2/1990 | Gilhousen et al. . |
| 4,905,221 | 2/1990 | Ichiyoshi . |
| 4,918,689 | 4/1990 | Hui . |

(List continued on next page.)

OTHER PUBLICATIONS

Technical Journal, vol. 64, No. 8, Oct. 1985, pp. 1926–1965.

W. W. McAlhaney et al. (1976) *BioSystems*, vol. 8, pp. 45–50.

L. L. Hsu et al. (1976) *BioSystems*, vol. 8, pp. 89–101.

D. L. Rohlfing et al. (1976) *BioSystems*, vol. 8, pp. 139–145.

S. W. Fox (1976) *Origins of Life*, vol. 7, pp. 49–68.

S. Brooke et al. (1977) *BioSystems*, vol. 9, pp. 1–22.

A. M. Gol'dovskii (1978) *Zhurnal Evolyutsionnoi Biokhimii i Fiziologii*, vol. 14(6), pp. 517–519.

J. C. Lacey, Jr. et al. (1979) *BioSystems*, vol. 11, pp. 1–7.

J. C. Lacey, Jr. et al. (1979) *BioSystems*, vol. 11, pp. 9–17.

K. Harada et al. (1979) *BioSystems*, vol. 11, pp. 47–53.

P. Melius (1979) *BioSystems*, vol. 11, pp. 125–132.

S. W. Fox (1980) *Naturwissenschaften*, vol. 67, pp. 378–383.

T. Nakashima et al. (1980) *J. Mol. Evol.*, vol. 15, pp. 161–168.

Y. Ishima et al. (1981), *BioSystems*, vol. 14, pp. 243–251.

B. Heinz et al. (1981) *BioSystems*, vol. 14, pp. 33–40.

T. Nakashima et al. (1981) *BioSystems*, vol. 14, pp. 151–161.

K. Matsuno (1981) *BioSystems*, vol. 14, pp. 163–170.

A. T. Przybylski et al. (1982) *Die Naturwissenschaften*, vol. 69, pp. 561–563.

K. Matsuno (1982) *BioSystems*, vol. 15, pp. 1–11.

E. Kokufuta et al. (1984) *BioSystems*, vol. 16, pp. 175–181.

S. W. Fox (1984) *Origins of Life*, vol. 14, pp. 485–488.

V. J. A. Novak (1984) *Origins of Life*, vol. 14, pp. 513–522.

K. Matsuno (1984) *BioSystems*, vol. 17, pp. 11–14.

A. T. Przybylski (1985) *BioSystems*, vol. 17, pp. 281–288.

M. Martinez Luque-Romero et al. (1986) *BioSystems*, vol. 19, pp. 267–272.

P. Melius et al. (1987) *BioSystems*, vol. 20, pp. 213–217.

G. Vaughan et al. (1987) *BioSystems*, vol. 20, pp. 219–223.

(List continued on next page.)

U.S. PATENT DOCUMENTS

| | | |
|---|---|---|
| 4,943,973 | 7/1990 | Werner . |
| 4,965,759 | 10/1990 | Uchida et al. . |
| 4,979,186 | 12/1990 | Fullerton . |
| 4,984,247 | 1/1991 | Kaufmann et al. . |
| 4,995,083 | 2/1991 | Baker et al. . |
| 5,005,183 | 4/1991 | Carey et al. . |
| 5,008,953 | 4/1991 | Dahlin et al. . |
| 5,016,255 | 5/1991 | Dixon et al. . |
| 5,018,165 | 5/1991 | Sohner et al. . |
| 5,022,047 | 6/1991 | Dixon et al. . |
| 5,023,887 | 6/1991 | Takeuchi et al. . |
| 5,025,452 | 6/1991 | Sohner et al. . |
| 5,042,050 | 8/1991 | Owen . |
| 5,056,109 | 10/1991 | Gilhousen et al. . |
| 5,073,900 | 12/1991 | Mallinckrodt . |
| 5,101,501 | 3/1992 | Gilhousen et al. ............... 375/1 |
| 5,109,390 | 4/1992 | Gilhousen et al. . |
| 5,179,571 | 1/1993 | Schilling ............... 375/1 |
| 5,218,618 | 6/1993 | Sagey ............... 375/1 |

OTHER PUBLICATIONS

C. B. Airaudo et al. (1987) *Journal of Food Science,* vol. 52(6), pp. 1750–1752.

Z. Masinovsky et al. (1989) *BioSystems,* vol. 22, pp. 305–310.

M. V. Vol'kenshtein (1989) *Molekulyarnaya Biologiya,* vol. 23(1), pp. 33–51.

A. T. Przybylski et al. (1984) *Applied Biochemistry and Biotechnology,* vol. 10, pp. 301–307.

(1985) *Chemical Abstracts,* vol. No. 105(1), Abstract No. 12027p.

(1985) *Chemical Abstracts,* vol. No. 102(6), Abstract No. 50870d.

THREE-CELL WIRELESS COMMUNICATION SYSTEM

BACKGROUND OF THE INVENTION

1. Field of the Invention

This invention relates to cellular radio communication. More specifically, this invention relates to a cellular radio communication system including a repeated pattern of three cells.

2. Description of Related Art

In a wireless communication system it is generally necessary for a receiver to distinguish between those signals in its operating region that it should accept and those it should reject. A common method in the art is frequency division (FDMA), in which a separate frequency is assigned to each communication channel. Another common method in the art is time division (TDMA), in which a separate timeslot in a periodic time frame is assigned to each communication channel.

One problem which has arisen in the art is that contiguous coverage of a large area using radio communication has required a cellular configuration with a large number of cells, and thus with only a small number of frequencies available per cell. In an FDMA system, all relatively proximate cells, not just adjacent cells, must operate on different frequencies, and frequencies may be reused only sufficiently far away that stations using those frequencies no longer interfere. In general, with homogenous conditions and equal-power transmitters, the distance between perimeters of like-frequency cells must be at least two to three times the diameter of a single cell. This had led to a seven-cell configuration now in common use for cellular networks.

Another problem which has arisen in the art when the cells are disposed in a three-dimensional configuration, particularly in low-power applications where many transmitters are in close proximity. In addition to avoiding interference from close transmitters, these systems may require complex techniques for handing off mobile stations from one cell to another, and for reassigning unused frequencies. This makes the physical location of each cell's central station critical, and thus requires careful coordination of an entire communication system layout.

U.S. Pat. No. 4,790,000 exemplifies the art.

Accordingly, an object of this invention is to provide a wireless communication system including a pattern having a reduced number of cells. Other and further objects of this invention are to provide a communication system which is less complex, which allows for reduced cell size, which can easily be extended from a two-dimensional to a three-dimensional configuration, which can reject interference, and which allows independent installation of multiple communication systems.

SUMMARY OF THE INVENTION

The invention provides a wireless communication system including a repeated pattern of cells, in which base station transmitters and user station transmitters for each cell may be assigned a spread-spectrum code for modulating radio signal communication in that cell. Accordingly, radio signals used in that cell are spread across a bandwidth sufficiently wide that both base station receivers and user station receivers in an adjacent cell may distinguish communication which originates in one cell from another. (Preferably, adjacent cells may use distinguishable frequencies and distinguishable codes, but it is sufficient if adjacent cells use distinguishable frequencies and identical codes.) A repeated pattern of cells allows the codes each to be re-used in a plurality of cells.

In a preferred embodiment, a limited number (three is preferred) of spread-spectrum codes may be selected for minimal cross-correlation attribute, and the cells may be arranged in a repeated pattern of three cells, as shown in FIG. 1. Station ID information may be included with data communication messages so that base stations and user stations may distinguish senders and address recipients. Mobile user stations may be handed off between base stations which they move from one cell to the next.

In a preferred embodiment, codes may be assigned dynamically for each cell by each of a plurality of independent communication systems, after accounting for use by other systems. Preferably, if a control station for a second system determines that two codes are in use closest to it, it may select a third code for use in its nearest cell, and dynamically assign codes for other cells to account for that initial assignment. A control station for the first system may also dynamically reassign codes to account for the presence of the second system. Preferably, this technique may also be applied to a three-dimensional configuration of cells.

In a preferred embodiment, time division and frequency division reduce the potential for interference between station transmitters. In a preferred embodiment, each independent communication system may dynamically assign (and reassign) a frequency or frequencies to use from a limited number (three is preferred) of frequencies, after accounting for use by other systems, similarly to the manner in which codes are dynamically assigned and reassigned from a limited number of codes.

DESCRIPTION OF THE PREFERRED EMBODIMENT

Figure 1:
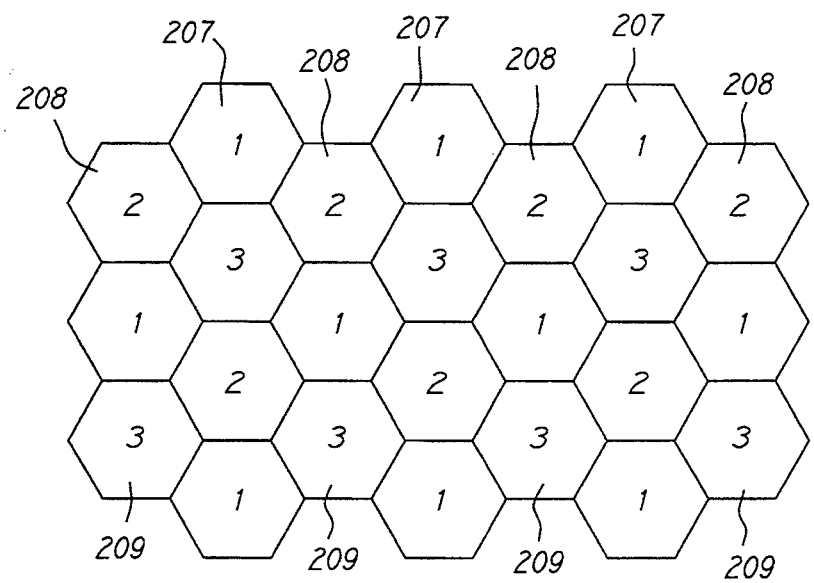
FIG. 1 shows a repeated pattern of three cells.
Figure 2:
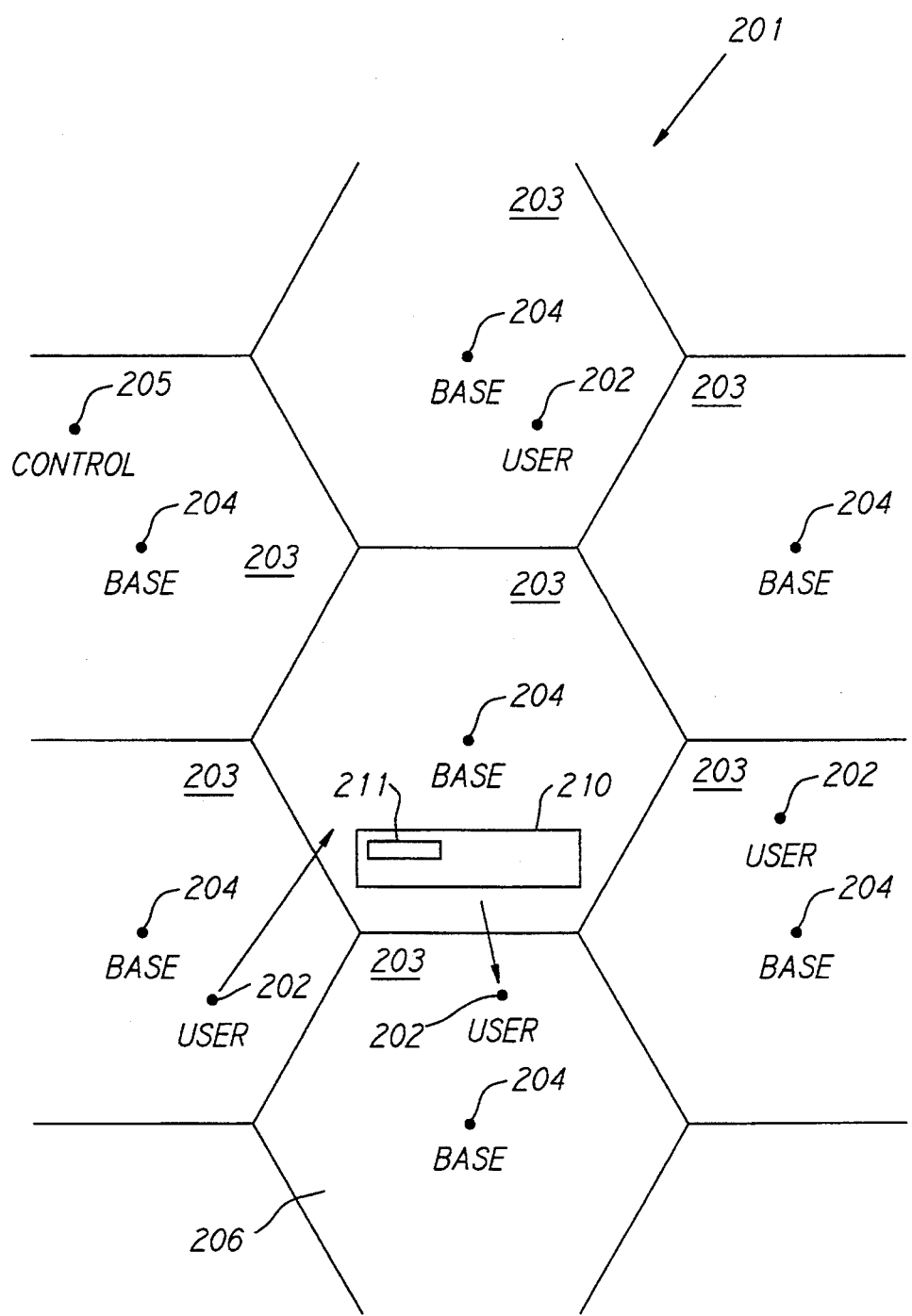
FIG. 2 shows a wireless communication system.

FIG. 1 shows a repeated pattern of three cells.
FIG. 2 shows a wireless communication system.

A wireless communication system 201 for communication among a plurality of user stations 202 includes a plurality of cells 203, each with a base station 204, typically located at the center of the cell 203. Each station (both the base stations 204 and the user stations 202) generally comprises a receiver and a transmitter.

In a preferred embodiment, a control station 205 (also comprising a receiver and a transmitter) manages the resources of the system 201. The control station 205 assigns the base station 204 transmitters and user station 202 transmitters in each cell 203 a spread-spectrum code for modulating radio signal communication in that cell 203. Accordingly, radio signals used in that cell 203 are spread across a bandwidth sufficiently wide that both base station 204 receivers and user station 202 receivers in an adjacent cell 206 may distinguish communication which originates in the first cell 203 from communication which originates in the adjacent cell 206.

Preferably, adjacent cells 203 may use distinguishable frequencies and distinguishable codes, but it is sufficient if adjacent cells 203 use distinguishable frequencies and identical codes. Thus, cells 203 which are separated by an intervening cell 203 may use the same frequency and a distinguishable code, so that frequencies may be reused in a tightly packed repeated pattern. As noted herein, spread-spectrum codes which are highly orthogonal are more easily distinguishable and therefore preferred.

The cells 203 may be disposed in the repeated pattern shown in FIG. 1. A cell 203 will be in one of three classes: a first class A 207, a second class B 208, or a third class C 209. No cell 203 of class A 207 is adjacent to any other cell 203 of class A 207, no cell 203 of class B 208 is adjacent to any other cell 203 of class B 208, and no cell 203 of class C 209 is adjacent to any other cell 203 of class C 209. In a preferred embodiment, three spread-spectrum codes may be preselected, such as for minimal cross-correlation attribute, and one such code assigned to each class of cells 203.

However, it would be clear to one of ordinary skill in the art, after perusal of the specification, drawings and claims herein, that alternative arrangements of the cells 203 would also be workable. For example, the cells 203 might be arranged in a different pattern. Alternatively, each base station 204 and each user station 202 may be assigned a separate code, which may then be used to identify that station. Hybrids between these two extremes, such as assigning a common code to a designated class of stations, may be preferred where circumstances indicate an advantage. It would be clear to one of ordinary skill in the art, that such alternatives would be workable, and are within the scope and spirit of the invention.

In a preferred embodiment, only a single code is used for all base stations 204 and user stations 202 in a single cell 203. A message 210 which is transmitted by a base station 204 or a user station 202 may comprise a portion 211 which comprises station ID information, such as a unique ID for the transmitting station. This allows base stations 204 and user stations 202 to distinguish the sender and to address the recipient(s) of the message 210.

When a mobile user station 202 exits the first cell 203 and enters the adjacent cell 206, the user station 202 is "handed off" from the first cell 203 to the adjacent cell 206, as is well known in the art. Determining when the user station 202 should be handed off may be achieved in one of several ways, including measures of signal strength, bit error rate, cross-correlation interference, measurement of distance based on arrival time or position locationing, and other techniques which are well known in the art. Alternatively, the mobile user station 202 may simply lose communication with the base station 204 for the first cell 203 and re-establish communication with the base station 204 for the adjacent cell 206, also by means of techniques which are well known in the art.

Figure 3:
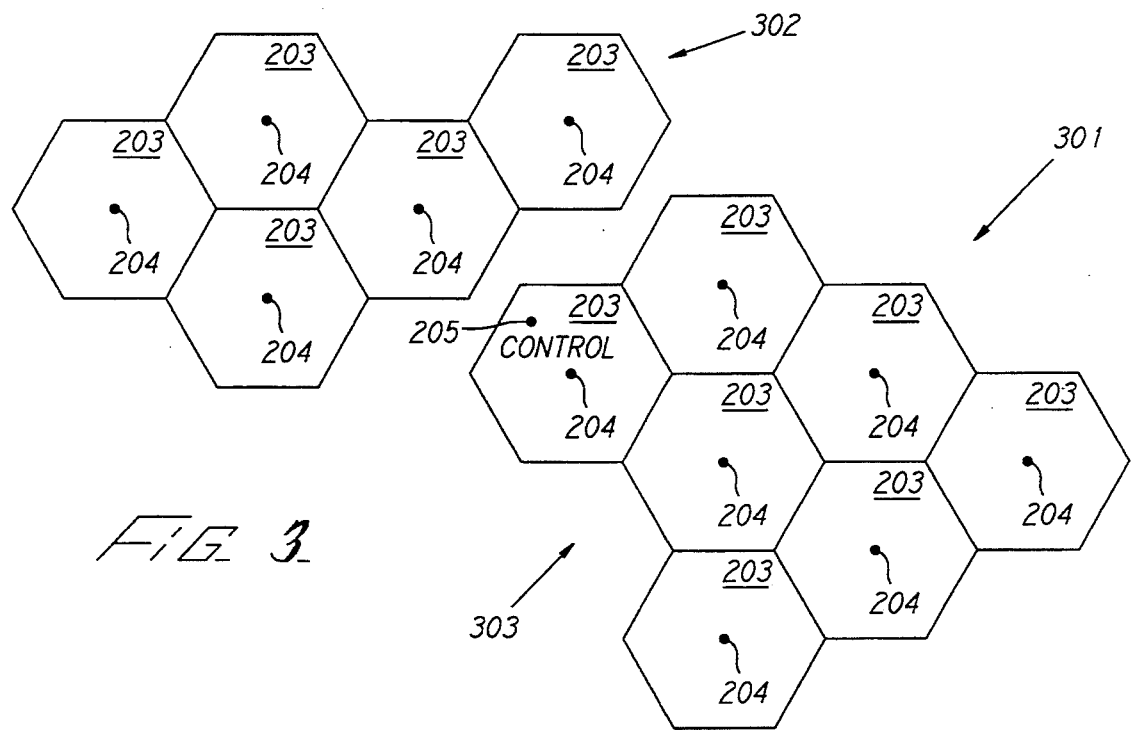
FIG. 3 shows a region with a plurality of independent communication systems.

FIG. 3 shows a region with a plurality of independent communication systems.

In a preferred embodiment, a single region 301 may comprise both a first system 302 and a second system 303 for wireless communication. The cells 203 of the first system 302 will be distinct from the cells 203 of the second system 303. Rather than disposing the cells 203 of either the first system 302 or the second system 303 in repeated patterns which may clash, the cells 203 each may have a code which is dynamically assigned (or reassigned), with the first system 302 accounting for use by the second system 303 and vice versa.

In a preferred embodiment, the first system 302 may assign a code to each of the cells 203 based on a limited set of codes and a repeated pattern such as that in FIG. 1. The second system 303 may then determine those codes in the limited set which are in closest use to the control station 205 for the second system 303. The second system 303 may then select one of the remaining codes, and assign the selected code to the cell 203 comprising its control station 205. The control station 205 for the second system 303 may then assign a code to each of the cells 203 in the second system 303 based on the same limited set of codes and a repeated pattern such as that in FIG. 1. In a preferred embodiment, the limited set may comprise three codes, and up to two such closest codes may be determined.

More generally, the first system 302 and the second system 303 may each assign a code to each of the cells 203 in their respective systems, based on a limited set of common codes. For each of the cells 203, either the first system 302 or the second system 303 will manage the base station 204 for that cell 203, and thus be in control of that cell 203. The system in control of that cell 203 may dynamically determine those codes from the limited set which are in closest use to the base station 204 for the cell 203, select one of the remaining codes, and assign the selected code to the cell 203.

It would be clear to one of ordinary skill in the art, after perusal of the specification, drawings and claims herein, that application of the disclosed techniques for dynamic assignment (and reassignment) of codes to cells 203 to a three-dimensional configuration of cells 203, would be workable, and is within the scope and spirit of the invention.

In a preferred embodiment, time division is also used. A pulsed-transmitter based system, a minimized number of pulses, and a minimized duration of each pulse reduce the probability of collisions, as is well known in the art. Multiple transmitters may thus all use the same code and the same frequency, as is well known in the art.

In a preferred embodiment, frequency division is also used. Three techniques are disclosed; the third is a preferred embodiment for many envisioned environments. However, it would be clear to one of ordinary skill in the art, after perusal of the specification, drawings and claims herein, that other techniques would be workable, and are within the scope and spirit of the invention. It would also be clear to one of ordinary skill that these techniques may be used with spread-spectrum frequency offset techniques instead of frequency division.

(1) If the region 301 comprises only the first system 302 alone, two frequencies may be used. All of the base stations 204 use a first frequency, while all of the user stations 202 use a second frequency. Accordingly, all of the base stations 204 can receive signals from all of the user stations 202, but the use of multiple sufficiently orthogonal spread-spectrum codes allows each base station 204 to reject signals from outside its own cell 203. (Spread-spectrum codes which are highly orthogonal are preferred.) The first frequency and the second frequency must be sufficiently separated so that interference does not occur.

(2) If the region 301 comprises both the first system 302 and the second system 303, frequencies may be assigned dynamically. All of the base station 204 transmitters in each system use a first frequency, selected from a limited set. All of the user station 202 transmitters in each system use a second frequency, also selected from a limited set, not necessarily the same set. Moreover, each system may dynamically assign and reassign frequencies in like manner as disclosed above for dynamic assignment and reassignment of codes. In like manner as to codes, in a preferred embodiment, the limited set may comprise three frequencies, and up to two such closest frequencies may be determined.

(3) If the region 301 comprises both the first system 302 and the second system 303, frequencies may be assigned dynamically. All of the base station 204 transmitters and all of the user station 202 transmitters in each cell 203 use a single frequency, selected from a limited set. Each base station 204 dynamically determines those frequencies from the limited set which are in closest use to it, and selects one of the remaining frequencies for use in the cell 203. The base station 204 transmitters and the user station 202 transmitters may be time-division duplexed. (Time-division duplexing is well known in the art.) In like manner as to codes, in a preferred embodiment, the limited set may comprise three frequencies, and up to two such closest frequencies may be determined.

The amount of separation required between frequencies (while also using code-division and time-division techniques) is dependent upon distance between the user stations 202 in each cell 203, as well as upon the technique used for modulation and demodulation encoded signals. As is well known in the art, some modulation techniques allow for overlapping wideband signals whose center frequencies are offset by a minimum amount necessary to distinguish between otherwise cross-correlating signals. In a preferred embodiment, such modulation techniques may be used, allowing more efficient use of frequency spectrum and allowing frequencies to be reused at closer proximity.

ALTERNATIVE EMBODIMENTS

While preferred embodiments are disclosed herein, many variations are possible which remain within the concept and scope of the invention, and these variations would become clear to one of ordinary skill in the art after perusal of the specification, drawings and claims herein.

For example, it would be clear to one of ordinary skill in the art, after perusal of the specification, drawings and claims herein, that other and further techniques, such as adjustable power control, cell sectoring, directional antennas, and antennae diversity, may be used to enhance a wireless communication system embodying the principles of the invention. Moreover, it would be clear to one of ordinary skill that a system also employing such other and further techniques would be workable, and is within the scope and spirit of the invention.

I claim:

1. A time division multiple access wireless communication system, comprising
    a repeated pattern of three cells, each cell having a base station; and
    a user station;
    wherein said base station and said user station communicate using time division multiple access;
    wherein transmitters in a first cell are assigned a first spread-spectrum code for modulating radio communication in said first cell;
    whereby radio signals used in said first cell are spread across a bandwidth sufficiently wide that receivers in a second cell, said second cell being adjacent to said first cell, may distinguish communication which originates in said first cell from communication which originates in said second cell; and
    whereby said first spread-spectrum code is reused in a plurality of cells such that said first cell in said pattern using said first spread-spectrum code is not adjacent to any other cell using said first spread-spectrum code.

2. A time division multiple access wireless communication system as in claim 1, wherein said repeated pattern comprises a configuration which is repeated along three mutually orthogonal axes.

3. A time division multiple access wireless communication system as in claim 1, wherein said user station transmitters emit data communication messages which include station identification information.

4. A time division multiple access wireless communication system as in claim 1, wherein said codes are assigned dynamically for each cell.

5. A time division multiple access wireless communication system, comprising
    a repeated pattern of cells, each cell having a base station; and
    a user station;
    wherein said base station and said user station communicate using time division multiple access;
    wherein transmitters in a first cell are assigned a first spread-spectrum code for modulating radio communication in said first cell;
    whereby radio signals used in said first cell are spread across a bandwidth sufficiently wide that receivers in a second cell, said second cell being adjacent to said first cell, may distinguish communication which originates in said first cell from communication which originates in said second cell;
    whereby said first spread-spectrum code is reused in a plurality of cells such that said first cell in said pattern using said first spread-spectrum code is not adjacent to any other cell using said first spread-spectrum code; and
    wherein said codes are assigned dynamically for each cell by each of a plurality of independent communication systems, after accounting for use by other systems.

6. A time division multiple access wireless communication system as in claim 5, wherein said use is concurrent use.

7. A time division multiple access wireless communication system as in claim 5, wherein said use is prior use.

8. A time division multiple access wireless communication system as in claim 1, wherein said codes comprise a set of codes with minimal cross-correlation attributes.

9. A time division multiple access wireless communication system as in claim 6,
    wherein said codes comprise a limited number of predetermined codes; and
    wherein said repeated pattern consists essentially of three classes of cells.

10. A time division multiple access wireless communication system as in claim 9, wherein said limited number is three.

11. A time division multiple access wireless communication system as in claim 9, further comprising means for frequency division in said base stations.

12. A time division multiple access wireless communication system as in claim 11, wherein a plurality of frequencies are assigned dynamically.

13. A time division multiple access wireless communication system as in claim 11, wherein a plurality of frequencies are assigned dynamically by each of a plurality of independent communication systems, after accounting for use by other systems.

14. A time division multiple access wireless communication system as in claim 13, wherein said use is concurrent use.

15. A time division multiple access wireless communication system as in claim 13, wherein said use is prior use.

16. A time division multiple access wireless communication system as in claim 1, wherein said repeated pattern consists essentially of three classes of cells.

17. A time division multiple access wireless communication system as in claim 1, wherein said repeated pattern consists essentially of a first class of cells, a second class of cells, and a third class of cells;
wherein no member of said first class is adjacent to another member of said first class, no member of said second class is adjacent to another member of said second class, and no member of said third class is adjacent to another member of said third class;
said first class being assigned a first spread-spectrum code, said second class being assigned a second spread-spectrum code, and said third class being assigned a third spread-spectrum code.

* * * * *

UNITED STATES PATENT AND TRADEMARK OFFICE
CERTIFICATE OF CORRECTION

Page 1 of 3

PATENT NO. : 5,402,413
DATED : March 28, 1995
INVENTOR(S) : Robert C. Dixon

It is certified that error appears in the above-indentified patent and that said Letters Patent is hereby corrected as shown below:

In claim 9, column 6, line 55, after the phrase "as in claim", delete "6" and substitute --5--.

Delete from list of "References Cited", under the subheading "OTHER PUBLICATIONS", the following references:
    W.W. McAlhaney et al. (1976) BioSystems, vol. 8, pp. 45-50.
    L.L. Hsu et al. (1976) BioSystems, vol. 8, pp. 89-101.
    D.L. Rohlfing et al. (1976) BioSystems, vol. 8, pp. 139-145.
    S.W. Fox (1976) Origins of Life, vol. 7, pp. 49-68.
    S. Brooke et al. (1977) BioSystems, Vol. 9, pp. 1-22.
    A.M. Gol'dovskii (1978) Zhurnal Evolyutsionnoi Biokhimii i Fiziologii, vol. 14(6), pp. 517-519.
    J.C. Lacey, Jr. et al. (1979) BioSystems, vol. 11, pp. 1-7.
    J.C. Lacey, Jr. et al. (1979) BioSystems, vol. 11, pp. 9-17.
    K. Harada et al. (1979) BioSystems, vol. 11, pp. 47-53.
    P. Melius (1979) BioSystems, vol. 11, pp. 125-132.
    S.W. Fox (1980) Naturwissenschaften, vol. 67, pp. 378-383.
    T. Nakashima et al. (1980) J. Mol. Evol., vol. 15, pp. 161-168.
    Y. Ishima et al. (1981) BioSystems, Vol. 14, pp. 243-251.

UNITED STATES PATENT AND TRADEMARK OFFICE
CERTIFICATE OF CORRECTION

Page 2 of 3

PATENT NO.  : 5,402,413
DATED       : March 28, 1995
INVENTOR(S) : Robert C. Dixon It is certified that error appears in the above-indentified patent and that said Letters Patent is hereby corrected as shown below:

Delete from list of "References Cited", under subheading "OTHER PUBLICATIONS", the following references:

B. Heinz et al. (1981) BioSystems, vol. 14, pp. 33-40.
T. Nakashima et al. (1981) BioSystems, vol. 14, pp. 151-161.
K. Matsuno (1981) BioSystems, vol. 14, pp. 163-170.
A.T. Przybylski et al. (1982) Die Naturwissenschaften, vol. 69, pp. 561-563.
K. Matsuno (1982) BioSystems, vol. 15, pp. 1-11.
E. Kokufuta et al. (1984) BioSystems, vol. 16, pp. 175-181.
S.W. Fox (1984) Origins of Life, vol. 14, pp. 485-488.
V.J.A. Novak (1984) Origins of Life, vol. 14, pp. 513-522.
K. Matsuno (1984) BioSystems, vol. 17, pp. 11-14.
A.T. Przybylski (1985) BioSystems, vol. 17, pp. 281-288.
M. Martinez Luque-Romero et al. (1986) BioSystems, vol. 19, pp. 267-272.
P. Melius et al. (1987) BioSystems, vol. 20, pp. 213-217.
G. Vaughan et al. (1987) BioSystems, vol. 20, pp. 219-223.
C.B. Airaudo et al. (1987) Journal of Food Science, vol. 52(6), pp. 1750-1752.
Z. Masinovsky et al. (1989) BioSystems, vol. 22, pp. 305-310.
M.V. Vol'kenshtein (1989) Molekulyarnaya Biologiya, vol. 23(1), pp. 33-51.
A.T. Przybylski et al. (1984) Applied Biochemistry and Biotechnology,

UNITED STATES PATENT AND TRADEMARK OFFICE
CERTIFICATE OF CORRECTION

PATENT NO. : 5,402,413
DATED : March 28, 1995
INVENTOR(S) : Robert C. Dixon

It is certified that error appears in the above-indentified patent and that said Letters Patent is hereby corrected as shown below:

vol. 10, pp. 301-307.
    (1985) Chemical Abstracts, vol. No. 105(1), Abstract No. 12027p.
    (1985) Chemical Abstracts, vol. No. 102(6), Abstract No. 50870d.

Signed and Sealed this

Twelfth Day of September, 1995

Attest:

BRUCE LEHMAN

Attesting Officer     Commissioner of Patents and Trademarks